(12) United States Patent
Suzuki et al.

(10) Patent No.: US 8,504,967 B2
(45) Date of Patent: Aug. 6, 2013

(54) CONFIGURABLE POWER SWITCH CELLS AND METHODOLOGY

(75) Inventors: Shingo Suzuki, San Jose, CA (US); Robert E. Lamburn, Jr., Santa Clara, CA (US); Neehar Jandhyala, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 491 days.

(21) Appl. No.: 12/879,772

(22) Filed: Sep. 10, 2010

(65) Prior Publication Data

US 2012/0066530 A1 Mar. 15, 2012

(51) Int. Cl.
*G06F 17/50* (2006.01)

(52) U.S. Cl.
USPC .......................................... 716/120; 716/133

(58) Field of Classification Search
None
See application file for complete search history.

(56) References Cited

U.S. PATENT DOCUMENTS

| | | | |
|---|---|---|---|
| 6,980,042 B2 | 12/2005 | LaBerge | |
| 7,046,052 B1 | 5/2006 | Percey | |
| 7,126,370 B2 | 10/2006 | Bhattacharya | |
| 7,190,187 B2 | 3/2007 | Hua et al. | |
| 7,276,932 B2 * | 10/2007 | Kuang et al. | 326/33 |
| 7,304,512 B2 | 12/2007 | Duvillard | |
| 7,411,423 B2 | 8/2008 | Berthold et al. | |
| 7,420,388 B2 | 9/2008 | Bhattacharya | |
| 7,479,801 B2 | 1/2009 | Bhattacharya | |
| 7,508,256 B2 * | 3/2009 | Hillman et al. | 327/565 |
| 7,545,177 B1 | 6/2009 | Kao et al. | |
| 7,605,631 B2 | 10/2009 | LaBerge | |
| 7,659,746 B2 | 2/2010 | Chua-Eoan et al. | |
| 7,716,609 B1 | 5/2010 | Taheri | |
| 7,863,778 B2 * | 1/2011 | Flynn et al. | 307/140 |
| 8,026,471 B2 | 9/2011 | Itzler | |
| 8,098,533 B2 * | 1/2012 | Nii et al. | 365/189.11 |
| 8,120,208 B2 | 2/2012 | Takayanagi | |
| 8,183,713 B2 * | 5/2012 | Rao et al. | 307/38 |
| 8,362,805 B2 | 1/2013 | Suzuki et al. | |
| 8,421,499 B2 | 4/2013 | Takayanagi et al. | |
| 2004/0184289 A1 | 9/2004 | Vinciarelli | |
| 2006/0055391 A1 | 3/2006 | Kuang | |
| 2006/0261855 A1 | 11/2006 | Hillman et al. | |
| 2008/0093632 A1 | 4/2008 | Sakurabayashi | |
| 2009/0066164 A1 | 3/2009 | Flynn et al. | |
| 2009/0160253 A1 | 6/2009 | Rao et al. | |
| 2009/0268531 A1 | 10/2009 | Nii et al. | |

OTHER PUBLICATIONS

Mutoh et al., "Design Method of MTCMOS Power Switch for Low-Voltage High-Speed LSIs," Proc. ASP-DAC 1999, pp. 113-116.*

(Continued)

*Primary Examiner* — Leigh Garbowski
(74) *Attorney, Agent, or Firm* — Lawrence J. Merkel; Meyertons, Hood, Kivlin, Kowert & Goetzel PC

(57) ABSTRACT

In one embodiment, a configurable power switch cell methodology may include designing multiple power switch cells which may be assembled to form a set of power switches such as a power switch segment. The power switch cells may all be designed to occupy the same amount of integrated circuit area, in an embodiment. Accordingly, one cell may be readily replaced by another, even late in the design process, without disturbing the placement of surrounding circuitry. In an embodiment, the power switch cells may include the interconnect layers that connect between cells, and abutting the power switch cells may automatically connect the interconnect between cells. Accordingly, swapping one power switch cell for another may be accomplished by placing the cell. No routing work may be required.

20 Claims, 6 Drawing Sheets

OTHER PUBLICATIONS

Royannez et al., "90nm Low Leakage SoC Design Techniques for Wireless Applications," 2005 IEEE ISSCC, pp. 138-139, 589.*
Ling, "Damned if you do—The practice of power gating comes with its own problems," New Electronics, May 2005, pp. 27-28.*
Office Action in U.S. Appl. No. 12/705,834 issued on Aug. 21, 2012.
International Search Report and Written Opinion mailed Jan. 10, 2012 in PCT/US2011/048998, 13 pages.
International Search Report and Written Opinion in Application No. EP 11179367.5-2215 I 2429079 Issued on Sep. 26, 2012, pp. 1-7.
U.S. Appl. No. 12/705,834, filed Feb. 15, 2010.
U.S. Appl. No. 12/705,837, filed Feb. 15, 2010.
J.B. Kuang, et al., "The Design and Implementation of a Low-Overhead Supply-Gated SRAM," IEEE, 2006, pp. 287-290.
Office Action from U.S. Appl. No. 12/705,837, Toshinari Takayanagi, mailed Nov. 14, 2012, pp. 1-7.
Notice of Preliminary Rejection and translation thereof in Korean Patent Application No. 10-2011-92168, Apr. 29, 2013, pp. 1-8.

* cited by examiner

CONFIGURABLE POWER SWITCH CELLS AND METHODOLOGY

BACKGROUND

1. Field of the Invention

This invention is related to the field of integrated circuits, and more particularly to supplying power to circuitry in integrated circuits.

2. Description of the Related Art

As the number of transistors included on an integrated circuit "chip" continues to increase, power management in the integrated circuits continues to increase in importance. Power management can be critical to integrated circuits that are included in mobile devices such as personal digital assistants (PDAs), cell phones, smart phones, laptop computers, net top computers, etc. These mobile devices often rely on battery power, and reducing power consumption in the integrated circuits can increase the life of the battery. Additionally, reducing power consumption can reduce the heat generated by the integrated circuit, which can reduce cooling requirements in the device that includes the integrated circuit (whether or not it is relying on battery power).

Clock gating is often used to reduce dynamic power consumption in an integrated circuit, disabling the clock to idle circuitry and thus preventing switching in the idle circuitry. While clock gating is effective at reducing the dynamic power consumption, the circuitry is still powered on. Leakage currents in the idle transistors lead to static power consumption. The faster transistors (those that react to input signal changes, e.g. on the gate terminals) also tend to have the higher leakage currents, which often results in high total leakage currents in the integrated circuit, especially in high performance devices.

To counteract the effects of leakage current, some integrated circuits have implemented power gating. With power gating, the power to ground path of the idle circuitry is interrupted, reducing the leakage current to near zero. There can still be a small amount of leakage current through the switches used to interrupt the power, but it is substantially less than the leakage of the idle circuitry as a whole.

Power gating presents challenges to the integrated circuit design. As blocks are powered up and powered down, the change in current flow to the blocks can create noise on the power supply connections. The noise can affect the operation of the integrated circuit, including causing erroneous operation. Additionally, the rate of change in the current flow varies with process variations in the semiconductor fabrication process, and can also vary with the magnitude of the supply voltage supplied to the integrated circuit and with the operating temperature of the integrated circuit. When these factors slow the rate of change of the current, the delay to enable a power gated block increases. Accordingly, balancing the delay to enable the power gated blocks and the power supply noise is challenging. Additionally, changes to the power gating circuitry over the design cycle and particularly late in the design is challenging to implement without disturbing the physical design of the integrated circuit.

SUMMARY

In one embodiment, a configurable power switch cell methodology may include designing multiple power switch cells which may be assembled to form a set of power switches such as a power switch segment. The power switch cells may all be designed to occupy the same amount of integrated circuit area, in an embodiment. Accordingly, one cell may be readily replaced by another, even late in the design process, without disturbing the placement of surrounding circuitry. In an embodiment, the power switch cells may include the interconnect layers that connect between cells, and abutting the power switch cells may automatically connect the interconnect between cells. Accordingly, swapping one power switch cell for another may be accomplished by placing the cell. No routing work may be required.

BRIEF DESCRIPTION OF THE DRAWINGS

The following detailed description makes reference to the accompanying drawings, which are now briefly described.

Figure 1:
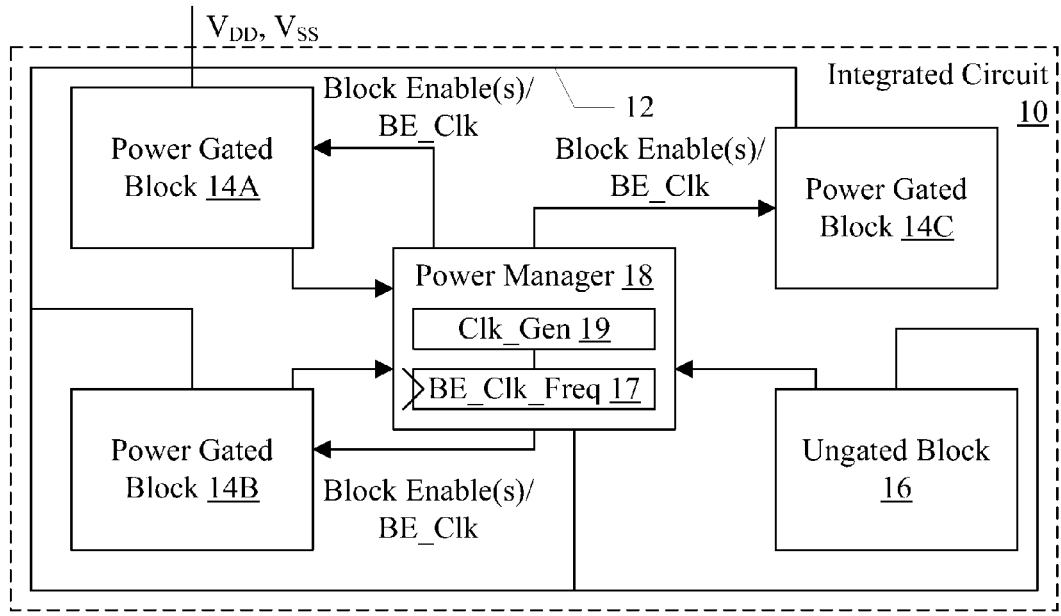
FIG. 1 is a block diagram of one embodiment of an integrated circuit.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits and/or memory storing program instructions executable to implement the operation. The memory can include volatile memory such as static or dynamic random access memory and/or nonvolatile memory such as optical or magnetic disk storage, flash memory, programmable read-only memories, etc. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component.

DETAILED DESCRIPTION OF EMBODIMENTS

An exemplary integrated circuit is described which includes sets of power switches, such as segments of power switches. Each segment may be formed from the power switch cells described below. As the design of the integrated circuit proceeds, the segments may be modified if the power switch configuration is changed. The nearby circuitry may not be disturbed by changes in the power switch segments, and routing of signal paths (such as the block enables) in the power switch segments may not be needed since connections may be made by abutting cells, as discussed below.

Overview of Integrated Circuit and Power Gated Blocks

Turning now to FIG. 1, a block diagram of one embodiment of an integrated circuit 10 is shown. The integrated circuit 10 is coupled to receive power supply inputs (e.g. $V_{DD}$ and $V_{SS}$, or power and ground, respectively). The $V_{DD}$ voltage may have a specified magnitude measured with respect to ground/$V_{SS}$ during use. More particularly, the $V_{DD}$ voltage may have a number of magnitudes that may be used for different operating points of the integrated circuit 10 during use. The integrated circuit 10 may include an interconnect, e.g. a global power supply grid, for each supply voltage, to distribute the voltage over an area occupied by the integrated circuit 10 (e.g. an area at the surface of a semiconductor substrate such as silicon). The global power supply grids are illustrated in FIG. 1 as the line 12 coupled to the blocks 14A-14C, 16, and 18 in FIG. 1. However, the grids may physically be arranged in a somewhat regular fashion, as described in more detail below.

The integrated circuit 10 may include one or more power gated circuit blocks such as blocks 14A-14C. Each block 14A-14C may include circuitry such as transistors that are arranged to implement the desired operations of the integrated circuit 10, and thus may be circuit blocks (although sometimes referred to herein as simply "blocks" for brevity). For example, the blocks 14A-14C may be processors or portions thereof (e.g. execution units within the processors); interface circuitry; peripheral circuitry such as graphics processing circuitry; user interface circuitry; multimedia circuitry such as audio and/or video processing circuitry; etc.

Generally, a circuit block may include a set of related circuits that implement one or more identifiable operations. The related circuits may be referred to as logic circuits or logic circuitry, since the circuits may implement logic operations on inputs to generate outputs. Because the circuits in a given circuit block are related, they may be powered up or powered down as a unit. Each circuit block may generally be treated as a unit during the design of the integrated circuit (e.g. being physically placed within the integrated circuit as a unit). The circuit block may further include memory circuitry (e.g. various static random access memories, or SRAMs) and other storage devices that are part of the logic circuitry.

A power gated circuit block (or simply a power gated block) may be a circuit block that may have at least one of its power supply voltages ($V_{DD}$ or $V_{SS}$) interrupted in response to deassertion of a block enable input signal. The power gated blocks may include power switches that are coupled to the global power supply grid and to a local power supply grid. If the enable is asserted, the power switches may electrically connect the global and local power supply grids. If the enable is deasserted, the power switches may electrically isolate the global and local power supply grids. When electrically connecting the grids, the power switch may be referred to as being on, and when electrically isolating the grids, the power switch may be referred to as being off. The voltage on the global power supply grid may appear on the local supply grid when electrically connected. However, the switches may have some impedance, and thus the voltage on the local power supply grid may differ from the voltage on the global power supply grid. The local supply voltage may be referred to as "virtual" (e.g. virtual $V_{DD}$ or virtual $V_{SS}$).

When a power gated block 14A-14C is enabled, the power switches turn on and current flows to charge (or discharge) the local power supply grid in the power gated block 14A-14C. In order to reduce the rate of change of current (di/dt) on the global power supply grids, which may generate enough noise to cause erroneous behavior in other circuitry in some cases, the power gated block 14A-14C may stagger the turn on of the power switches. Particularly, in the illustrated embodiment, the power gated blocks 14A-14C may receive a clock signal (BE_Clk in FIG. 1) in addition to one or more block enables. The power gated block 14A-14C may enable a different subset of the power switches in each clock cycle of the BE_Clk, thus reducing the rate of change of the current as compared to concurrently enabling the entire set of power switches. By controlling the frequency of the BE_Clk, the rate of change of the current may be controlled to acceptable levels, in some embodiments. More particularly, the power gated block 14A-14C may include a series-coupled set of flops or other clocked storage devices that are controlled by the BE_Clk. Each flop may be coupled to a respective subset of the power switches and may provide an enable to the subset responsive to the block enables and the BE_Clk from the power manager 18.

In the illustrated embodiment, the power manager 18 may include a clock generator circuit 19 that generates the BE_Clk clock. The frequency of the clock may be programmable (e.g. via software executing on a processor within the IC 10 or coupled to the IC 10) via the BE_Clk_Freq register 17 coupled to the clock generator circuit 19. In some embodiments, the programmed frequency may be independent of process/voltage/temperature (PVT) conditions in the integrated circuit. For example, the delay for power switches enabled by one flop in the power gated block may be determined for the fastest PVT conditions, and a frequency corresponding to ½ of the delay may be selected as the programmable frequency. In other embodiments, the frequency programmed into the register 17 may be based on an indication of the process parameters that were in place when the integrated circuit 10 was manufactured (e.g. the parameters may indicate a "fast" process, a "typical" process, or a "slow" process). The frequency may be also be based on the current supply voltage magnitude. A lower voltage may lead to slower transistor operation, reducing the di/dt effect as compared to higher voltages and thus permitting a higher frequency, if desired. In some embodiments, the frequency may also be based on operating temperature. A higher operating temperature may lead to slower transistor operation, reducing the di/dt effect as compared to lower temperatures and thus permitting a higher frequency, if desired. The clock generator circuit 19 may be any type of clock generator (e.g. a phase locked loop, a clock divider receiving an input clock and dividing it in frequency, a clock multiplier, etc.).

In addition to staggering the enable of the power switches, the power switches may include two or more device sizes for the transistors forming the power switches. Particularly, the power switches may include "small" transistors and "large" transistors. The small transistors (e.g. small channel widths) may have lower current capacity than larger transistors (e.g. large channel widths) but which may also have lower gate capacitance and thus may be turned on more rapidly. In some embodiments, the smaller transistors may be implemented with lower threshold voltages than the larger transistors as well. In one embodiment, the small transistors may be enabled first, generating a lower di/dt while the local power grid is charged, followed by the larger transistors. Generally, the size of a transistor may refer to its current capacity. For example, complementary metal oxide semiconductor (CMOS) transistors may measure size in terms of channel width.

A power manager 18 is coupled to the blocks 14A-14C and 16, and may be configured to monitor the activity in the blocks 14A-14C and 16 to generate the block enables for the power gated blocks 14A-14C. The activity in one block may be an indicator that another block is about to become active and should be powered up. For example, the blocks 14A-14C and 16 may be part of a pipeline. If one pipeline stage is active, it may be likely that the next stage will be active soon. Similarly, in a processor, a fetch request may indicate that instructions will be fetched and decoded soon, and thus the execution units may be powered up. Power gated blocks may be components of a system on a chip, and a communication from one component to another may indicate that a block may need to be powered up. Activity in a block may also indicate that the block or another block is about to be idle and may be powered down. While the ungated block 16 may not be enabled or disabled for power gating, its activity may be useful in determining if the power gated blocks may be disabled. In some embodiments, clock gating may be implemented in addition to power gating. In such embodiments, the power manager 18 may also implement the clock gating, or the clock gating may be implemented separately. While the power manager is shown as a block in FIG. 1, the power manager 18 may actually be distributed as desired.

Generally, the power manager 18 may be configured to deassert the block enable(s) to power down a block, and to assert the block enable(s) to power up a block. The block enable (and other signals described herein) may be asserted at one logical state and deasserted at the other logical state. For example, the signal may be asserted (indicating enable) at a low logical state (binary zero) and deasserted at a high logical state (binary one). The signal may alternatively be deasserted at the low logical state and asserted at the high logical state. Different signals may have different asserted/deasserted definitions. In some contexts, a signal may be referred to as asserted low, or alternatively asserted high, for additional clarity. There may be one or more block enables per power gated block. For example, there may be a block enable for each size of power switches (e.g. a small enable and a large enable). Alternatively, there may be one block enable per power gated block as transmitted by the power manager 18, and the power gated block may be configured to generate the small enable and large enable locally (or may generate any other desired enables locally).

In various embodiments, a period of time may elapse after a power gated block 14A-14C has its block enable deasserted before the supply voltage has drained, and there may be a period of time after assertion of the enable before the power gated block is considered stable and ready for use. The power manager 18 may be configured to account for these times when determining if the block enable may be deasserted, and in determining when to reassert the block enable for the next power up of the block.

The electrical isolation of the local and global power supply grids that may be provided by the power switches may generally refer to a lack of active current flow between the grids. The power switches themselves may have leakage current, so there may be some leakage current flow. Similarly, the electrical connection of the local and global power supply grids may refer to an active current flow between the grids to provide the voltage from the global grid to the local grid. Viewed in another way, electrically connected grids may have a very low impedance path between them, whereas electrically isolated grids may have a very high impedance path. Viewed in still another way, electrically connected grids may be actively passing a voltage from one grid to the other, wherein electrically isolated grids may be preventing the passing of the voltage.

The local and global power supply grids may generally distribute a power supply voltage over various areas of the integrated circuit 10. The global power supply grids distribute the voltage over the entire area of the integrated circuit 10, while local power supply grids distribute power supply voltages within a power gated block. The ungated blocks may also include local power supply grids, but since they do not include power switches, the local power supply grids may essentially be part of the global power supply grid. In general, the power supply grids may have any configuration. For example, in one embodiment, a given block may have power supply connections to the underlying circuitry at certain physical locations (e.g. regularly spaced channels over the area). The power supply grids may include wiring running above these regularly spaced channels. There may also be wires running in the orthogonal direction to the wiring, to reduce impedance and to supply current to any localized current "hot spots". Other grids may include any sort of distribution interconnect and/or there may be irregularities in the grids, or the interconnect may essentially be a plane of metal. In one embodiment, the global power supply grids may be provided in one or more of the highest layers of metal (wiring layers), i.e. those layers that are farthest from the surface of the semiconductor substrate. The local power supply grids may be included in lower layers of metal. Connections between the power supply grids may be made to the power switches at a surface of the semiconductor substrate. The metal may be any conductive material used for interconnect in the semiconductor fabrication process used to fabricate the integrated circuit 10. For example, the metal may be copper, aluminum, tungsten, combinations thereof (e.g. aluminum or copper wiring layers and tungsten vias), alloys thereof, etc.

The power supply voltages ($V_{DD}$ and $V_{SS}$) may generally be externally supplied to the integrated circuit, and may be generally intended to be relatively static during use. While the magnitude of the supply voltages may be intentionally changed during use (e.g. for power management), the magnitude changes are not intended to be interpreted by receiving circuits in the fashion that dynamically varying signals are interpreted. Similarly, local variations in the power supply voltages may occur (such as $V_{DD}$ droop or $V_{SS}$ bounce) during operation, but these variations may generally be undesirable transients. The power supply voltages may serve as sources and sinks of current as the circuitry evaluates.

As mentioned above, the power gated blocks 14A-14C may have their power gated, e.g. when inactive, to reduce power consumption in the integrated circuit. According, the power gated blocks 14A-14C are each coupled to receive an enable signal or signals (block enable(s) in FIG. 1). The block enable signal for each block may be a separate, unique signal for that block, so that the power gated blocks 14A-14C may be individually enabled or not enabled. In some cases, one or more power gated blocks may share an enable. A shared block enable may be physically the same signal, or logically the same signal (i.e. the signals are physically separate but logically operated the same way). The integrated circuit 10 may also include one or more ungated circuit blocks such as ungated block 16. Ungated blocks may be coupled to the power supply grids 12 without any power switches, and thus may be powered up whenever the integrated circuit 10 is powered up. Ungated blocks may be blocks that are active most or all of the time, so that including the power switches and attempting to power gate them is not expected to produce much power savings, if any, for example.

It is noted that, while one ungated block and three power gated blocks are shown in FIG. 1, there may generally be any number of one or more power gated blocks and ungated blocks, in various embodiments. Similarly, there may be more than one power manager 18 in the integrated circuit 10 (e.g. enabling/disabling various non-overlapping subsets of the power gated blocks).

It is noted that one or more circuit blocks may include state storage (e.g. memory, flops, registers). It may be desirable to retain the state in the state storage (or some of the state storage). In such cases, the global power grids may supply power to the state storage without power switches in the power to ground path. For example, a separate local power grid without power switches may be provided in the power gated block.

It is noted that more than one power supply voltage may be provided in the integrated circuit 10 (e.g. there may be multiple independent $V_{DD}$ inputs). For example, in an SOC, various circuit blocks may be supplied with different supply voltage magnitudes during operation.

Figure 2:
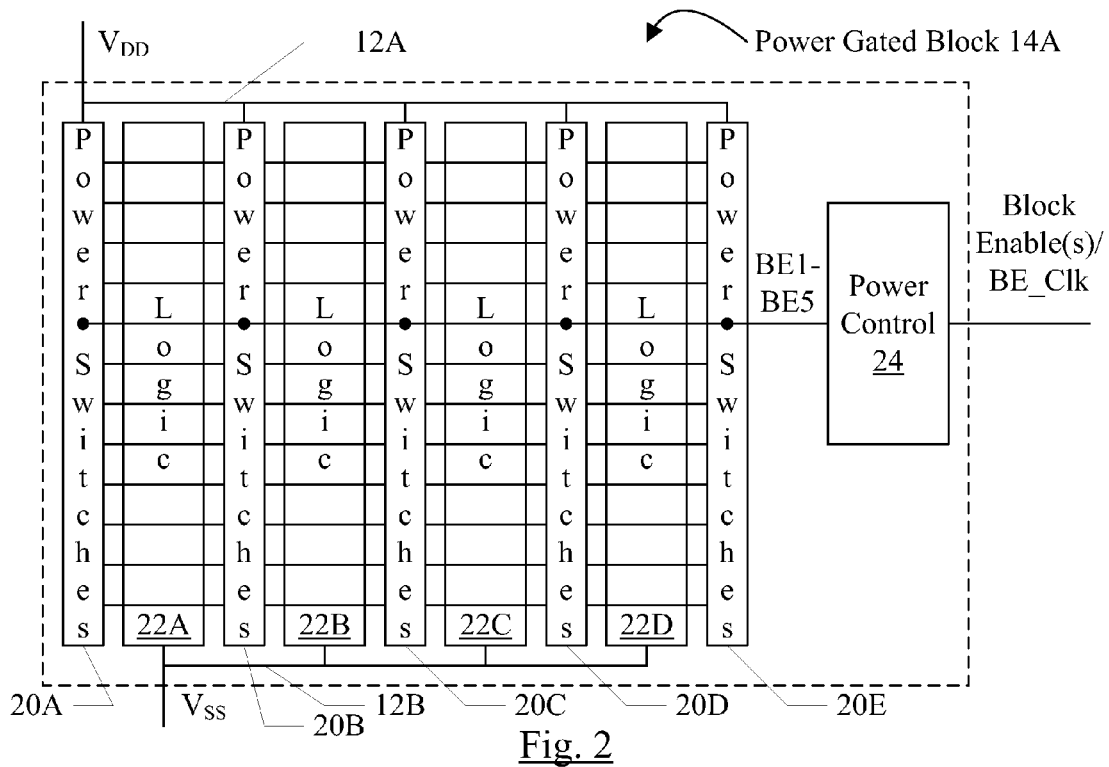
FIG. 2 is a block diagram of one embodiment of a power gated block shown in FIG. 1.

Turning now to FIG. 2, a block diagram of one embodiment of the power gated block 14A is shown. Other power gated blocks 14B-14C may be similar. In the embodiment of FIG. 2, the power gated block 14A includes multiple power switches located at a variety of physical locations within the power gated block 14A, as illustrated. That is, the power switches may be physically distributed over the area occupied by the power gated block 14A. In this embodiment, the power switches are placed at regularly spaced intervals, although other distributions that are not regular may be used in other embodiments. Each location may include multiple power switches (e.g. power switch segment 20A may include multiple power switches). The power switches at one location may be referred to as a segment of power switches 20A-20E. The power gated block 14A further includes a power control circuit 24. The power control circuit 24 is illustrated as a block in FIG. 2, but may be physically distributed near the locations of the power switch segments in some embodiments. The block enable and BE_Clk for the power gated block 14A are coupled to the power control circuit 24. The power control circuit 24 is coupled to each of the power switch segments 20A-20E, supplying each segment with a respective local block enable (BE1 to BE5 in FIG. 2).

In this embodiment, the power switches are coupled between the global $V_{DD}$ grid 12A and the local $V_{DD}$ grid of the power gated block 14A. The local $V_{DD}$ grid is illustrated as the horizontal lines in FIG. 2 between the power switch segments 20A-20E. Between each of the power switch segments 20A-20E, logic circuits 22A-22D are provided. The logic circuits 22A-22D may be powered by the local $V_{DD}$ grid, and also by the local $V_{SS}$ grid which is not shown in FIG. 2. The global $V_{SS}$ grid 12B is shown coupled to each of the logic circuits 22A-22E, but there may generally be a local $V_{SS}$ grid to which the global $V_{SS}$ grid 12B is coupled. While FIG. 2 shows the power switch segments 20A and 20E at the edges of the power gated block 14A with no circuitry between the edges of the power gated block 14A and the power switch segments 20A and 20E, these power switch segments may not necessarily be placed at the very edges. In other words, logic circuits may be placed to the left of the power switch segment 20A in FIG. 2 and/or to the right of power switch segment 20E in FIG. 2.

The power control circuit 24 may generate the local block enables BE1-BE5 for the segments responsive to the block enable and BE_Clk from the power manager 18. Particularly, the power control circuit 24 may stagger the local block enable assertions. For example, the power control circuit 24 may assert one local block enable per clock cycle of the BE_Clk. In other embodiments, more than one local block enable may be asserted per clock cycle, as long as the di/dt effects of enabling more than one segment per clock cycle are below design limits. Furthermore, in some embodiments, there may be more than one local block enable per segment, and the local block enables for a given segment may be staggered. The number of segments and local block enables in a power gated block may be varied and may be more or fewer than that shown in FIG. 2.

The power switches may generally comprise any circuitry that may electrically connect a local power supply grid to a global power supply grid in response to an asserted enable signal and may electrically isolate the local power supply grid from the global power supply grid in response to a deasserted enable signal. For example, each power switch may be a P-type Metal-Oxide-Semiconductor (PMOS) transistor for embodiments that implement power switches on the $V_{DD}$ power supply grid. The gate of the PMOS transistor may be coupled to receive the (possibly buffered) local block enable signal (BE1-BE5 in FIG. 2), may include a source coupled to the global $V_{DD}$ grid 12A, and may include a drain coupled to one or more local $V_{DD}$ grid lines. Accordingly, the block enable signal may be asserted low in this example, turning the PMOS transistor on and actively conducting current from the global $V_{DD}$ grid 12A to the local $V_{DD}$ grid lines. Embodiments which implement the power switches on the $V_{SS}$ grid may be similar, except that the transistor may be an N-type MOS (NMOS) transistor and the block enable may be asserted high/deasserted low in such embodiments.

Figure 3:
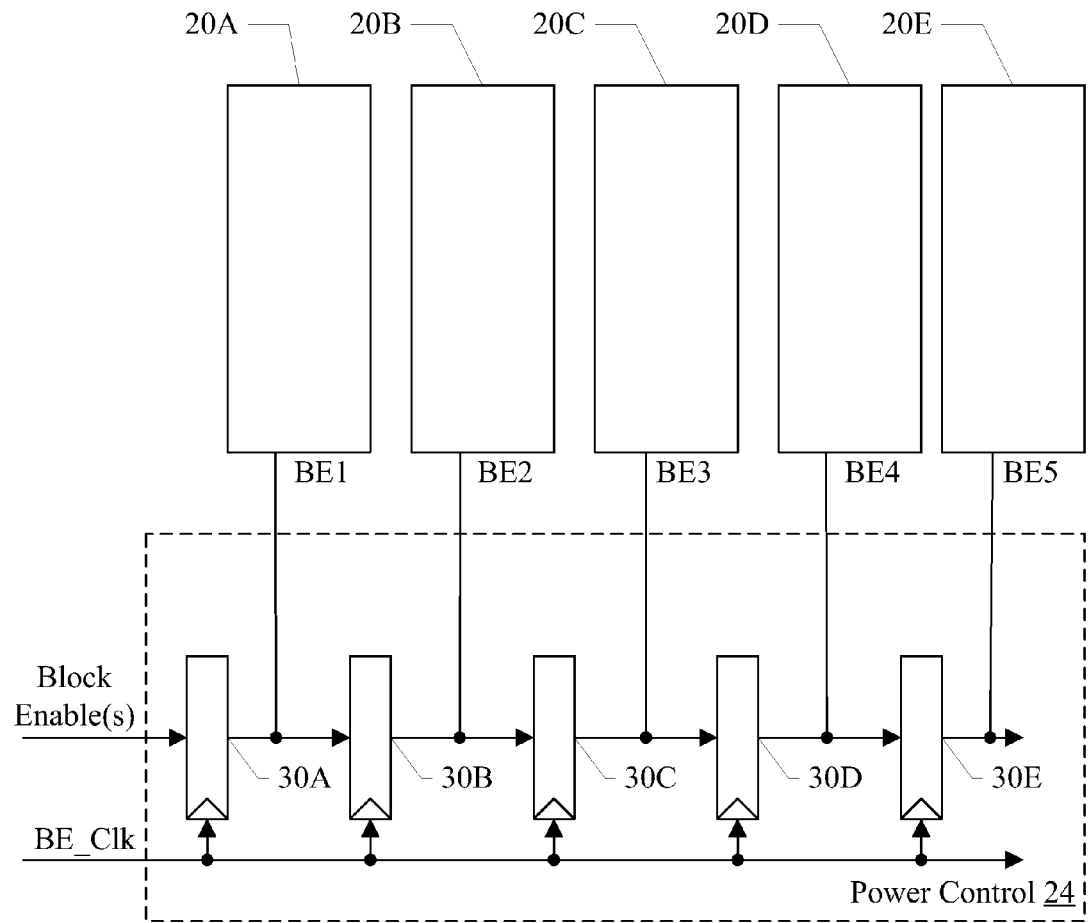
FIG. 3 is a block diagram illustrating one embodiment of a power control circuit and one embodiment of power switches for a power gated block shown in FIG. 2.

Turning next to FIG. 3, a block diagram illustrating one embodiment of the power control circuit 24 in greater detail is shown. In the illustrated embodiment, the power control circuit 24 includes a set of clocked storage devices 30A-30E. A clocked storage device may be any device that is configured to capture input data responsive to a clock signal and to store that data in a stable state until the next capture of data. Clocked storage devices may include flops, registers, latches, etc. Flops will be used as an example for the rest of this description, but in general any clocked storage devices may be used in other embodiments.

The flops 30A-30E are serially-connected to each other. That is, the output of each flop 30A-30E is connected as the input to another flop 30A-30E. For timing purposes, the output of each flop 30A-30E may be buffered and the output of the buffers may be the input to the next flop 30A-30E in the serial connection. In general, any connection the provides a logically equivalent signal output from one of the flops 30A-30E to another one of the flops 30A-30E may be a serial connection of the flops 30A-30E. Specifically, in the illustrated embodiment, the flop 30A is coupled to receive the block enable from the power manager 18; the flop 30B is coupled to receive the output of the flop 30A; the flop 30C is coupled to receive the output of the flop 30B; the flop 30D is coupled to receive the output of the flop 30C; the flop 30E is coupled to receive the output of the flop 30D; etc. The flops 30A-30E are clocked by the BE_Clk. Additionally, the output of each flop 30A-30E may be one of the local block enables BE1 to BE5, as illustrated in FIG. 3. Again, the outputs may be buffered if desired to produce the local block enables.

Together, the buffers and the load of the power switches in each power switch segment 20A-20E may cause a delay in the propagation of the block enable signal through the power switch segment 20A-20E. The power switch segments may be designed so that the propagation delay, in best case PVT conditions, presents a di/dt that is less than or equal to an acceptable di/dt for powering up the power gated block. Best case PVT may generally refer to the conditions that cause the circuitry response to be faster than the other combinations of conditions. That is, the best case process parameters may be parameters that produce circuits that respond the most rapidly. The best case voltage may be the highest supply voltage magnitude that is supported by the integrated circuit 10. The best case temperature may be the lowest temperature supported by the integrated circuit. Similarly, worst case PVT conditions may be the conditions that cause the circuitry to respond slower than other combinations. Thus, the worst case process parameters may produce circuits that respond slowly. The worst case voltage may be the lowest support voltage magnitude, and the worst case temperature may be the highest supported temperature.

Accordingly, if a power switch segment meets di/dt constraints at best case PVT conditions, and the clock period of the BE_Clk is at least as long as the local block enable propagation delay for the power switch segment, then the enabling of the power switch segments using the flops 30A-30E may meet di/dt constraints. Similarly, if more than one local block enable is used per power segment, the subset of power switches controlled by a given local block enable (and that associated buffering) may be designed so that the di/dt experienced when the enable is asserted meets the di/dt constraints. If two or more power switch segments 20A-20E are enabled using the same local block enable, the power switch segments may be designed so that the combination of the power switch segments meets the di/dt constraints.

In one embodiment, the BE_Clk frequency may be programmed so that the clock period is approximately twice the best case propagation delay. That is, the BE_Clk frequency maybe approximately ½ of the frequency that could be supported at best case PVT conditions. The programmed frequency may be used for any set of PVT conditions (that is, the frequency may be PVT immune). Such a frequency may provide the most rapid ramp rate across the PVT conditions without violating the di/dt constraints across the PVT conditions, in one embodiment. The wakeup time for the power gated block may be the programmed clock period multiplied by the number of flops in the series, plus the worst case delay of one power switch segment.

The programmed frequency may be approximately ½ of the best case frequency because, e.g., the frequency that is exactly ½ of the best case frequency may not be convenient to generate in the integrated circuit 10 based on the clock supplied to the integrated circuit 10. A frequency that is convenient to generate and that is nearest to ½ of the best case frequency among the convenient frequencies may be used, for example. Alternatively, a frequency that is convenient to generate and that is nearest to ½ of the best case frequency and less than ½ of the best case frequency may be used. The additional length of the clock period may provide guard banding for jitter or other clock uncertainty, uncertainty in the timing analysis, etc.

Accordingly, if other than best case PVT conditions exist, the propagation delay for one power switch segment (or local block enable) may not have completed when the next segment has its local block enable asserted. However, in these cases, the di/dt of each segment may be less than that experienced in best case PVT conditions. Thus, the overall di/dt may still meet the di/dt specification. In other embodiments, the frequency of the BE_Clk may be adjusted based on the PVT conditions actually experienced in the integrated circuit 10.

In some embodiments, a testability circuit may be provided to ensure connectivity in the local block enables. For example, each local block enable BE1-BE5 may be propagated, and then may be returned to the testability circuit. The testability circuit may include a string of OR gates which logically OR the block enable from the power manager 18 with the returned local block enables, generating a block enable good bar (BE_G_) signal. The testability circuit may also include a string of AND gates which logically AND the block enable from the power manager 18 with the returned local block enables to produce a block enable good signal (BE_G) signal. If the BE_G signal is a logical one in response to a logical one on the block enable from the power manager 18, then either the logical one has successfully propagated through the power switch segments or a stuck-at-one fault exists. Similarly, if the BE_G_ signal is a logical zero in response to a logical zero on the block enable from the power manager 18, then either the logical zero has successfully propagated through the power switch segments or a stuck-at-zero fault exists. If both the BE_G and BE_G_ signals are successfully sampled for corresponding values on the block enable from the power manager 18, then the connectivity of the local block enables is verified. In another embodiment, the flops 30A-30E may be scannable flops. The scan-in of each flop may be coupled to the return path from each respective switch segment, and the flops may be scanned to detect connectivity problems.

While the illustrated embodiment uses a serially-connected set of flops 30A-30E to stagger the block enables within the power gated block, other embodiments may use other configurations. For example, the returned local block enable from the power switch segment may be coupled to the input of the next flop 30A-30E (e.g. the returned BE1 from the power switch segment 20A, coupled as an input to the AND and OR gate of the testability circuit, may be coupled to the input of the flop 30B; the returned BE2 from the power switch segment 20B may be coupled to the input of the flop 30C; etc.).

Standard Cell Methodology for Power Switch Segments

As the design of a power gated block such as block 14A progresses, the configuration of power switches in a given power switch segment 20A-20E may change. To support the changes over the design cycle of the integrated circuit 10, a set of predesigned power switch cells are provided to form the power switch segments 20A-20E. In an embodiment, the power switch cells may all occupy the same amount of area on the integrated circuit 10, so one power switch cell may be replaced by another without disturbing the area occupied by the segment 20A-20E. Accordingly, the overall physical design of the power gated block may not be affected (e.g. the locations of the logic circuitry 22A-22D need not change, the wiring among the logic circuits need not change, etc.).

Additionally, in an embodiment, the power switch cells may include not only the circuitry that is included in the cell (except for some routing cells that do not include any circuitry), but also may include the interconnect layers for the block enable signals used by the power switches. The interconnect layers may be part of the so-called "metal" layers of the integrated circuit. For typical standard cells, such as the standard cells used in the logic circuitry 22A-22D, the cells may include local interconnect formed below the interconnect layers (e.g. poly-silicon interconnect) as well as ports to which the interconnect layers can be connected to provide input signals from other cells and transport output signals to other cells. However, interconnect between cells is added after the cells have been placed, in a routing step of the design process. With the power switch cells, the routing of the block enable signals may be known in advance. Each cell may include interconnect in the same spatial locations so that abutting the cells (or placing the cells adjacent to each other) may automatically connect the interconnect included in each cell. That is, the interconnect may extend completely to the edge of the cell, at a fixed location along the edge, so that the interconnect of the abutting cell makes contact and forms a conductive path. Accordingly, by assembling power switch cells to form a segment, the signal paths for the block enable signals through the segment may automatically be formed. No routing step may be required among the power switch cells.

Generally, a power switch cell may include any circuitry and/or interconnect that may be used to form a portion of a power segment. The power switch cells may include one or more of the following: switch cells (which include one or more power switches along with block enable interconnect), skip cells (explained in more detail below), buffer cells (which include buffer circuitry to buffer the block enable signals), turn cells to route a block enable traveling in one direction to a different direction, flop cells including one or more flops configured to capture and propagate the block enables according to the BE_Clk, and various routing cells which may include no circuitry but may include interconnect to form signal paths for the block enables. A signal path may include any interconnect that transports a signal from one physical location to another. The signal path may include the interconnect within one or more power switch cells. Interconnect may include any conductive material which may carry a signal (voltage and current).

Figure 4:
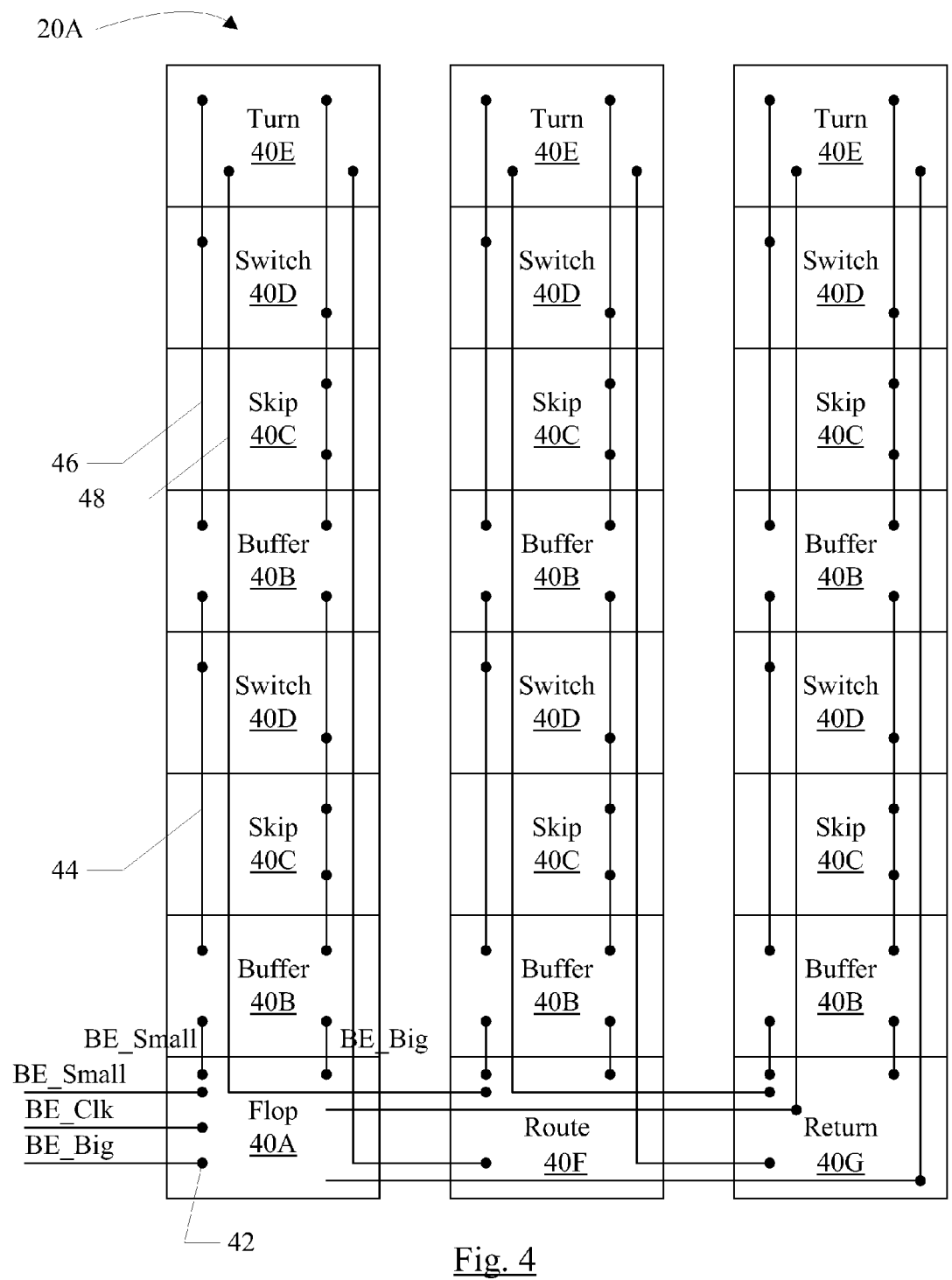
FIG. 4 is a block diagram illustrating one embodiment of a power switch segment in greater detail.

Turning now to FIG. 4, a block diagram of one embodiment of the power switch segment 20A formed from power switch cells is shown. Other power switch segments 20B-20E may be similar, although the arrangement of power switch cells may vary from segment to segment within a given power gated block and/or in different power gated blocks.

In the illustrated embodiment, three columns of power switch cells are shown. The power switch cells include a flop cell 40A, buffer cells 40B, skip cells 40C, switch cells 40D, turn cells 40E, a route cell 40F, and a return cell 40G. The interconnect in each cell is shown in FIG. 4. Dots on the interconnect (e.g. reference number 42) may indicate ports that connect the circuitry within the cell to the interconnect. By abutting the cells 40A-40G, the interconnect may form the signal paths for the block enables. For example, the small block enable (BE_Small in FIG. 4) may be received by the flop cell 40A, and may be propagated from the flop cell 40A to the buffer cell 40B. The buffer cell 40B may include buffer circuitry to buffer the BE_small signal and output the buffered signal. The output interconnect, along with the interconnect over the skip and switch cells 40C and 40D and the input interconnect to the next buffer cell 40B, forms a conductor 44 that is part of the signal path for the BE_small signal. Similarly the conductors 46 and 48 may form part of the signal path for the BE_small signal, and then the BE_small signal may be propagated to the next column in the segment 20A through the flop cell 40A. In other embodiments, instead of a turn cell 40E at the top of the first column, a route cell 40F may be used to transmit the BE_small signal to the next column. The return cell 40G may return the BE_small signal to the flop cell 40A (e.g. for connection to another flop cell 40A, not shown). In other embodiments, the return cell 40G may not be used and the BE_small signal may be routed to another segment from the left column as shown in FIG. 4. The BE_Big signal may also be routed through the segment 20A in a similar fashion.

The embodiment of the segment 20A in FIG. 4 is merely exemplary. Other embodiments may include more or fewer columns. Additionally, other embodiments may have arbitrary shapes of power switch cells. For example, routing cells or turn cells may be defined which permit abutting cells to the right or left of a power switch cell as shown in FIG. 4. Thus, any desired shape for a power switch segment may be supported in various embodiments.

Figure 5:
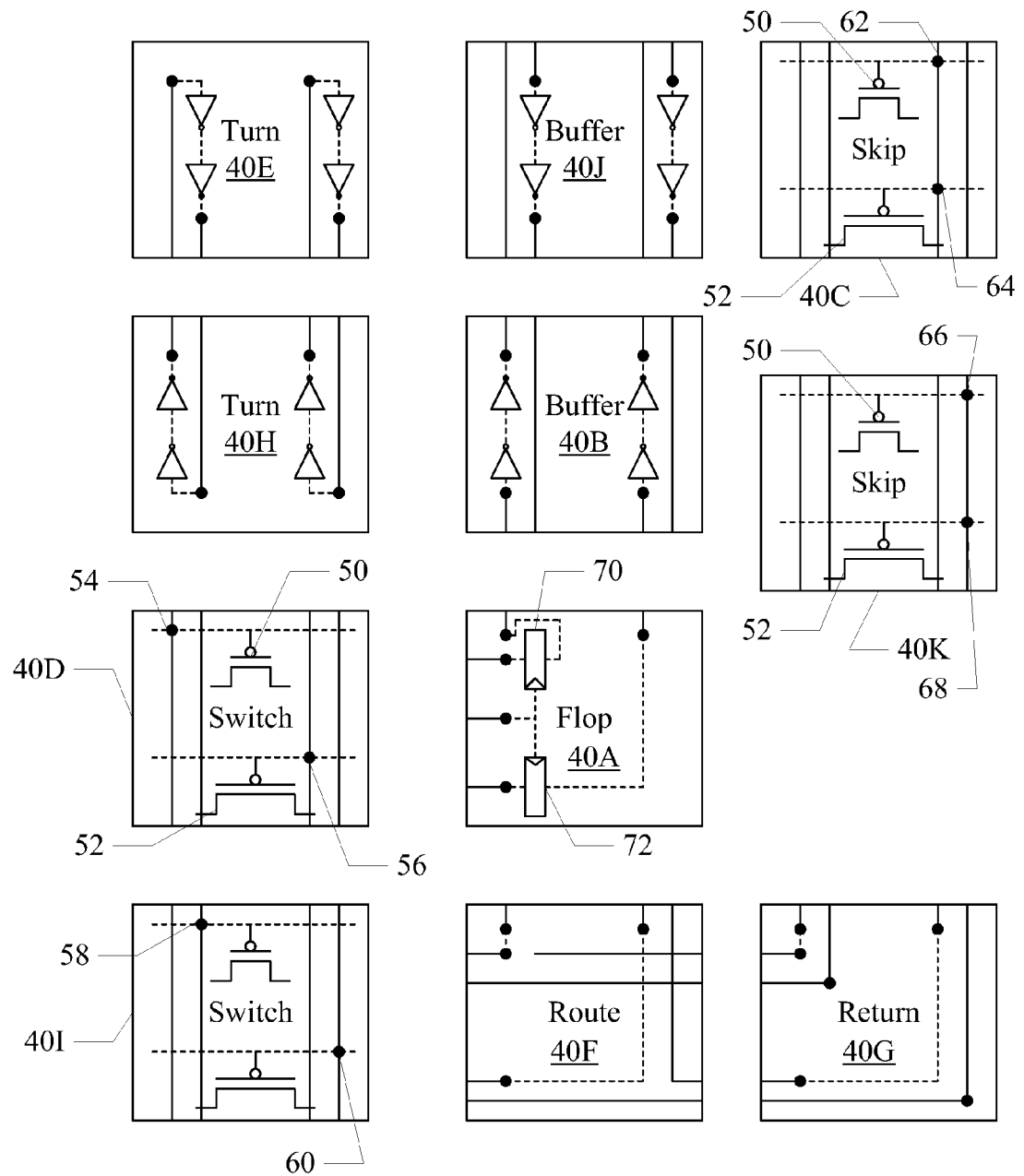
FIG. 5 is a block diagram illustrating one embodiment of various power switch cells.

FIG. 5 is a block diagram illustrating various embodiments of power switch cells for an embodiment of the power switch cell methodology. The interconnect that is included in a cell is shown as solid lines in FIG. 5. Local connections within the cells are shown as dashed lines.

The turn cell 40E may be one embodiment of the corresponding cell shown in FIG. 4. The turn cell 40E may include the interconnect to receive the signal traveling upward in FIG. 4, and may buffer the signal through a pair of inverters while also changing the direction of travel of the signal to downward as shown in FIG. 4. The turn cell 40E may turn both the BE_small and BE_Big signal. Another turn cell 40H is also shown in FIG. 4. The turn cell 40H may be the opposite of the turn cell 40E, receiving the downward traveling signal and turning it, through buffering inverters, to an upward traveling signal. Other embodiments may also support turning an upward or downward traveling signal right or left, and/or turning a right or left traveling signal upward or downward. That is, the turn cells 40E and 40H may turn signals 180 degrees, and 90 degree or 270 degree turns may also be supported (or any other directions, as desired). The interconnect for the block enable signals may extend to the bottom edge (turn cell 40E) or top edge (turn cell 40H), to make contact with interconnect in the adjacent cells as discussed previously.

It is noted that signal-traveling directions (upward, downward, right and left) are relative to the depiction of the cells in the figures, and are used merely for discussion purposes. The signals may generally travel in a plane parallel to a surface of a semiconductor substrate on which the integrated circuit 10 is formed, or perpendicular to the plane at vias between layers.

The switch cell 40D is illustrated as well, and includes one or more small switches 50 and one or more large switches 52. The gate terminal(s) of the small switches 50 are coupled to receive the upward traveling BE_Small signal (port 54), and the gate terminal(s) of the large switches 52 are coupled to the BE_Big signal (port 56). Each of the switches 50 and 52 may have a source coupled to the global $V_{DD}$ grid and a drain coupled to the local $V_{DD}$ grid (not shown in FIG. 5). As illustrated, each switch may be a PMOS transistor in this embodiment. The switches 50 may be one or more small PMOS transistors (short channel width), and the switches 52 may be one or more large PMOS transistors (wide channel width) transistors, for example. Accordingly, the switches 50 and 52 may be activated (turned on) by a low assertion of the corresponding block enable signal. Another switch cell 40I is illustrated as well. The switch cell 40I may be coupled to receive the downward traveling BE_Small and BE_Big signals (ports 58 and 60, respectively). Other embodiments may implement combinations of coupling to one upward traveling and one downward traveling signal. In each case, the interconnect for both the upward traveling signals and the downward traveling signals may be provided in the switch cells 40D and 40I. The interconnect may extend to the top and bottom edges of the cells, as shown, to make contact with interconnect in adjacent cells. Thus, the interconnect in the switch cells 40D and 40I thus passes the upward and downward traveling signals through the cells.

The buffer cell 40B is illustrated in FIG. 5 and includes buffer circuitry for the upward traveling signals. Another buffer cell 40J includes buffer circuitry for the downward traveling signals. The non-buffered signals are provided with pass through interconnect. Like with switch cells 40D and 40I, the interconnect may extend to the edges of the buffer cells 40B and 40J to make contact with interconnect in adjacent cells. Buffer cells which buffer signal in both the upward traveling and downward traveling direction may also be implemented in some embodiments.

The skip cell 40C is shown with both the small power switches 50 and the large power switches 52 coupled to receive the upward traveling BE_Big signal (ports 62 and 64, respectively). Similarly, the skip cell 40K may include both the small power switches 50 and the large power switches 52 coupled to receive the downward traveling BE_Big signal (ports 66 and 68, respectively). Other embodiments may couple one of the switches 50 and 52 to the upward traveling BE_Big signal and the other to the downward traveling BE_Big signal. Again similar to the switch cells 40D and 40I, the interconnect in the skip cells 40C and 40K may extend to the top and bottom edges of the cell to make contact with abutting cells.

The skip cells may not couple the small power switches in the cell to the BE_small signal, reducing the number of small power switches that are turned on in response to the BE_small assertion. Using a skip cell instead of a switch cell may reduce the number of transistors that are activated early in the power up of a power gated block, and thus may reduce the di/dt noise on the power supply. Thus, the speed at which power up occurs and the corresponding di/dt noise and other properties of the power switches may be adjusted by selecting differing numbers of switch cells as compared to skip cells.

In other embodiments, skip cells may not include the small switches 50. In still other embodiments (e.g. embodiments that implement only one size of power switches), the skip cells may be routing cells that include no circuitry.

The flop cell 40A includes flops 70 and 72 to capture the BE_Small and BE_Big block enables, respectively, responsive to the BE_Clk signal. Other embodiments may implement more or fewer block enables, and corresponding more or fewer flops. The output of the flop 70 is coupled to the port for the BE_Small signal traveling upward out of the cell, and the output of the flop 72 is coupled to the port for the BE_Big signal traveling upward out of the cell. Together, the flops 70 and 72 may be an implementation of one of the flops 30A-30E shown in FIG. 3. The interconnect for the downward traveling return BE_Small and BE_Big signals (and for the return signals that may arrive from the right side of the cell) are not shown in FIG. 5 so as not to obscure the underlying flops, but the interconnect may be provided as shown in FIG. 4. The interconnect in the flop cell 40A may extend to the left, right, and top edges of the cell to make contact with interconnect to abutting cells and to make contact with the BE_Big, BE_Small, and BE_Clk signals input to the cell 40A. The input signals may be routed to the segment including the flop cell 40A using normal routing techniques.

The route cell 40F and return cell 40G may include only interconnect, in the illustrated embodiment. In an embodiment, all of the interconnect may be included in the metal layers, even though some of the interconnect is shown in dashed form in FIG. 5. Various additional route/return cells may be defined in embodiments to permit additional flexibility. As with the other cells discussed above, the interconnect may extend to the edges of the cells 40F and 40G to make contact with other cells.

It is noted that the set of power switch cells illustrated in FIG. 5 is one embodiment, and other embodiments may implement other sets of power switch cells, including any subsets of the cells shown as well as any subset or superset with additional cells. For example, an embodiment may include the switch cell 40D, the buffer cell 40B, and the skip cell 40C and may be uni-directional on the buffer enable signals. In such and embodiment, the interconnect for the signal paths flowing the block enable signals in the opposite direction need not be included. Another embodiment may include the switch cells 40D and 40I, the buffer cells 40B and 40J, the skip cells 40C and 40K, and the turn cells 40E and 40H and may include bi-directional block enable signals. Another embodiment may include the cells 40B-40E and 40H-40K, as well as the flop cell 40A for staggering block enables to the segments. Still another embodiment may implement flop cell 40A in the uni-directional case described above.

As mentioned previously, the set of power switch cells may be designed to all occupy the same area on the integrated circuit 10. That is, the length and width of each power cell may be equal to the length and width of each other power cell in the set. The area (length/width) may be equal in terms of the nominal design although manufacturing variations may cause small variations in the actual sizes of cells built on a particular instance of the integrated circuit.

Figure 6:
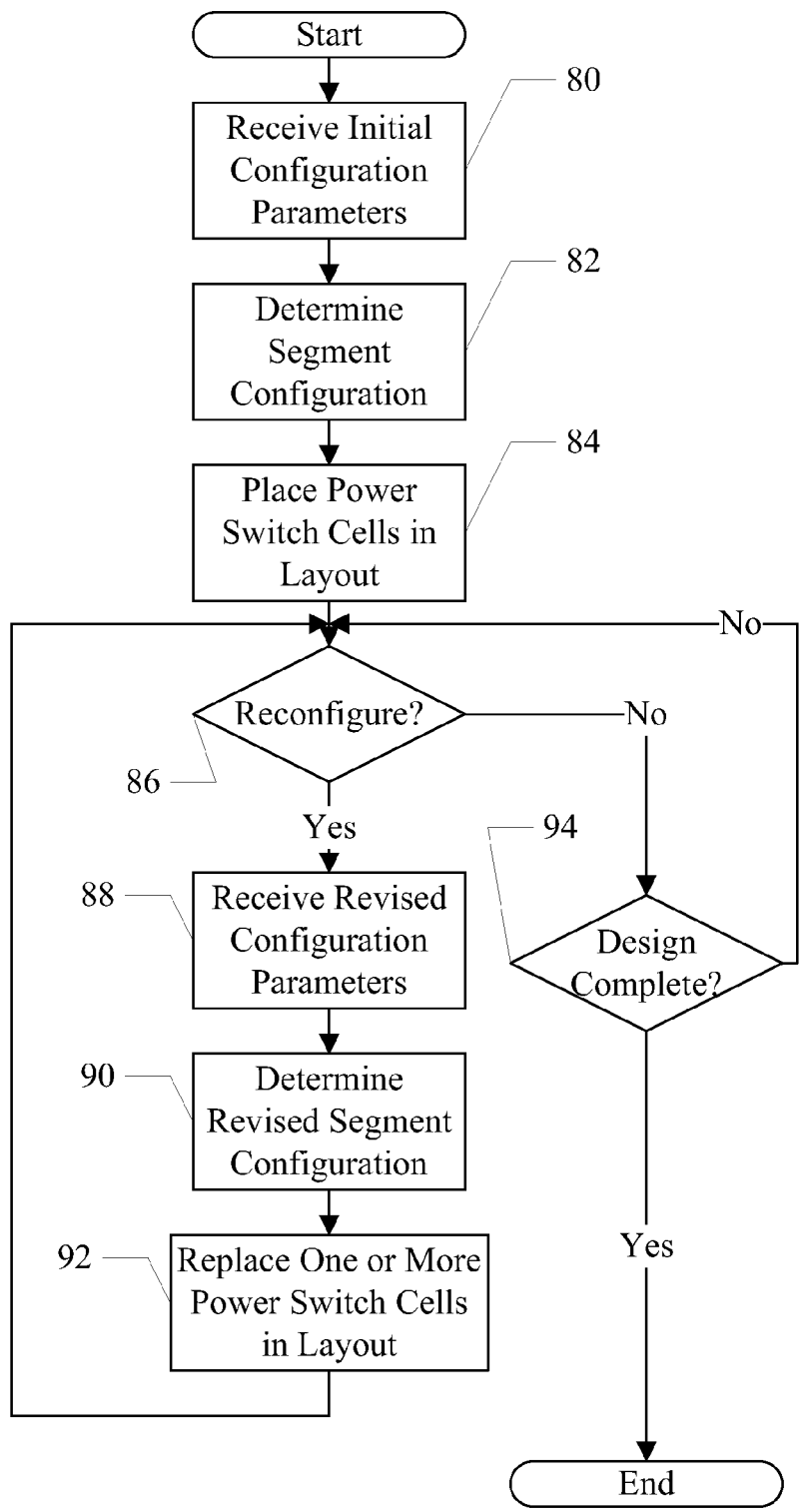
FIG. 6 is a flowchart illustrating one embodiment of a methodology for configuring power switch segments.

FIG. 6 is a flowchart illustrating one embodiment of a methodology for power switch segments using the power switch cells illustrated in FIG. 5. While blocks are shown in a particular order in FIG. 6 for ease of understanding, other orders may be used. In some embodiments, a portion or all of the flowchart of FIG. 6 may be implemented in software (e.g. in power switch compiler).

In one embodiment, the power switch compiler may generate the power switch cell configuration for a power switch segment based on a set of configuration parameters provided by a user (e.g. a designer of a power gated block). The configuration parameters may take any form in various embodiments, and may be specified in a variety of ways. For example, the configuration parameters may be provided in a configuration file input to the power switch compiler. The configuration parameters may be provided manually, as command line arguments when the power switch complier is invoked or in a graphical user interface to the program. In an embodiment, the configuration parameters may specify a ratio of buffer cells to the sum of switch and skip cells, and a ratio of switch cells to skip cells. The buffer cell ratio may be a trade off between fan out control and area of the power switch segments (more buffer cells result in lower fan out, but larger area). The switch/skip cell ratio may be a trade off between the delay to power up a power gated block and the di/dt effects.

The power switch compiler may receive an initial set of configuration parameters (block 80). Based on the configuration parameters, the power switch compiler may determine a segment configuration (block 82). For example, each segment may have an allocated amount of area within the power gated block. Based on the allocated area and the size of the power switch cells, the number and arrangement of cells may be determined. Based on the ratios specified in the configuration parameters, the power switch compiler may determine a configuration for the segment. For example, the number of various types of power switch cells may be determined. The power switch compiler may distribute the cells to the upward traveling and downward traveling block enables in any desired fashion. For example, approximately equal loads maybe placed on the upward traveling signal and the downward traveling signal. The physical arrangement of power switch cells may also be determined. The power switch compiler may select the power switch cells and may place the selected power switch cells within the specified areas of the layout of the power gated block (block 84). As mentioned previously, the power switch cells may be abutted to connect the interconnect included within the power switch cells to form the signal paths.

As the design proceeds and is refined, the designer may determine that the power switch segments are to be reconfigured (decision block 86, "yes" leg). The designer may provide revised configuration parameters to the power switch compiler (block 88), which may determine the revised segment configuration (block 90). Determining the revised configuration may be similar to determining the initial configuration (block 82). The power switch compiler may select the power switch cells and may replace power switch cells in the layout (as compared to the previous configuration) to form the revised power switch segment (block 92). Alternatively, the power switch compiler may simply place the selected power switch cells as a new layout in place of the previous configuration. That is, the power switch compiler may repeat blocks 80, 82, and 84 for each reconfiguration. If there are no more reconfigurations (decision block 86, "no" leg) and the design is completed (decision block 94, "yes" leg), the methodology may be completed. On the other hand, additional iterations may be possible if the design is not yet complete.

Computer Accessible Storage Medium and System

Figure 7:
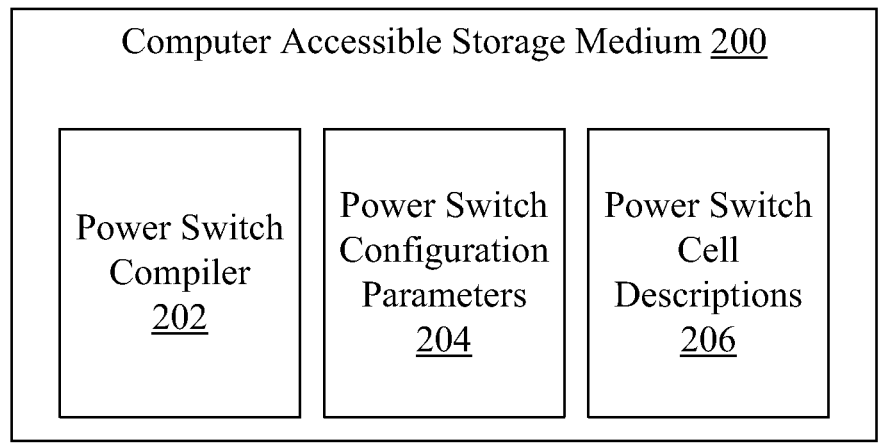
FIG. 7 is a block diagram of one embodiment of a computer accessible storage medium.

Turning now to FIG. 7, a block diagram of a computer accessible storage medium 200 is shown. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, a flash memory interface (FMI), a serial peripheral interface (SPI), etc. Storage media may include microelectromechanical systems (MEMS), as well as storage media accessible via a communication medium such as a network and/or a wireless link. The computer accessible storage medium 200 in FIG. 7 may store a power switch compiler 202, power switch configuration parameter files 204, and power switch cell descriptions 206. The power switch compiler 202 may include instructions which, when executed on a computer, may be configured to implement the operation described for the power switch compiler. For example, the power switch compiler 202 may include instructions which, when executed, implement the operation described for the power switch compiler with regard to FIG. 6. The power switch configuration parameter files 204 may store the power switch configuration parameters provided by the designer, for the case that power switch configuration parameters are provided via files. The power switch cell descriptions 206 may comprise files described the power switch cells 40 (e.g. register transfer level (RTL) descriptions or other hardware description language (HDL) descriptions, netlists, schematics, and/or general data set II (GDSII) data describing mask objects, etc.). A carrier medium may include computer accessible storage media as well as transmission media such as wired or wireless transmission.

Figure 8:
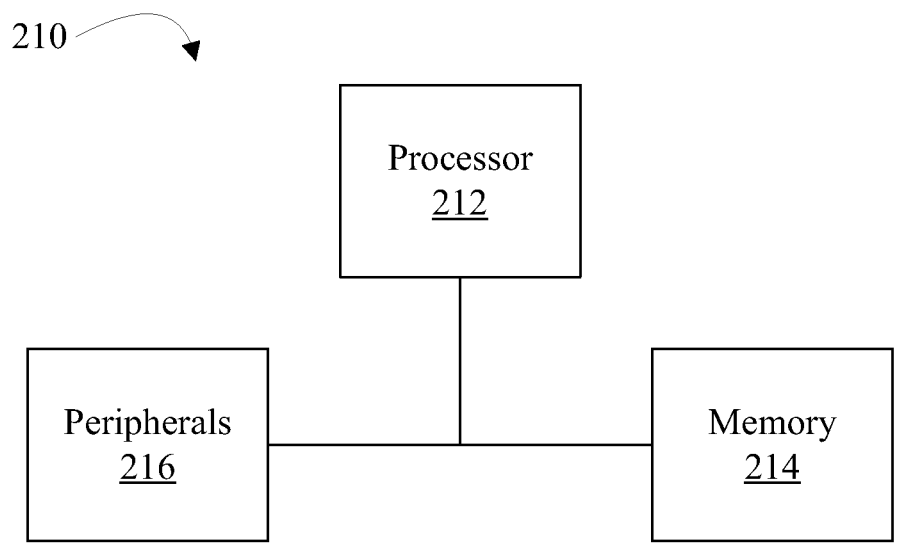
FIG. 8 is a block diagram of one embodiment of a computer system.

FIG. 8 is a block diagram of one embodiment of an exemplary computer system 210. In the embodiment of FIG. 8, the computer system 210 includes a processor 212, a memory 214, and various peripheral devices 216. The processor 212 is coupled to the memory 214 and the peripheral devices 216.

The processor 212 is configured to execute instructions, including the instructions in the software described herein such as the power switch compiler 202. In various embodiments, the processor 212 may implement any desired instruction set (e.g. Intel Architecture-32 (IA-32, also known as x86), IA-32 with 64 bit extensions, x86-64, PowerPC, Sparc, MIPS, ARM, IA-64, etc.). In some embodiments, the computer system 210 may include more than one processor.

The processor 212 may be coupled to the memory 214 and the peripheral devices 216 in any desired fashion. For example, in some embodiments, the processor 212 may be coupled to the memory 214 and/or the peripheral devices 216 via various interconnect. Alternatively or in addition, one or more bridge chips may be used to coupled the processor 212, the memory 214, and the peripheral devices 216.

The memory 214 may comprise any type of memory system. For example, the memory 214 may comprise DRAM, and more particularly double data rate (DDR) SDRAM, RDRAM, etc. A memory controller may be included to interface to the memory 214, and/or the processor 212 may include a memory controller. The memory 214 may store the instructions to be executed by the processor 212 during use, data to be operated upon by the processor 212 during use, etc.

Peripheral devices 216 may represent any sort of hardware devices that may be included in the computer system 210 or coupled thereto (e.g. storage devices, optionally including a computer accessible storage medium 200, other input/output (I/O) devices such as video hardware, audio hardware, user interface devices, networking hardware, etc.).

Numerous variations and modifications will become apparent to those skilled in the art once the above disclosure is fully appreciated. It is intended that the following claims be interpreted to embrace all such variations and modifications.

What is claimed is:

1. A method comprising:
   determining, on a computer that includes a description of an integrated circuit including a segment of power switches, a power switch configuration for the segment, wherein the determining comprises selecting power switch cells from a plurality of predesigned power switch cells in a library stored on the computer, wherein the selecting is responsive to the power switch configuration, wherein each power switch cell of the plurality of predesigned power switch cells includes an interconnect between the power switch cells for the area occupied by that power switch cell, wherein a first power switch cell of the plurality of predesigned power switch cells includes one or more first transistors controlled by a first enable signal and one or more second transistors controlled by a second enable signal, and wherein the first transistors have a first size that is less than a second size of the second transistors, and wherein a second power switch cell of the plurality of predesigned power switch cells includes one or more third transistors having the first size but excludes a connection to the first enable signal for the one or more third transistors, and wherein the first enable signal is routed through the second power switch cell on the interconnect of the second power switch cell to connect to the interconnect of a third power switch cell in the segment; and placing, by the computer in the description of the integrated circuit, the selected power switch cells to form the segment, wherein abutting power switch cells automatically connects the cells via the interconnect included in the selected power switch cells, the abutting power switch cells forming an electrical connection via contact between the interconnect included in the abutting power switch cells to form a conductive path between the abutting cells in the interconnect.

2. The method as recited in claim 1 wherein the plurality of predesigned power switch cells further includes a buffer cell having buffer circuitry for the interconnect.

3. The method as recited in claim 2 wherein the plurality of predesigned power switch cells further includes a turn cell configured to receive the first enable signal and to propagate the first enable signal traveling in an opposite direction.

4. The method as recited in claim 3 further comprising placing a second plurality of predesigned cells abutting at least one end of the segment, the second plurality of predesigned cells comprising a flop cell coupled to receive an input enable signal as an input to a flop on the flop cell, wherein an output of the flop cell is the first enable signal.

5. The method as recited in claim 4 wherein the second plurality of predesigned cells comprise one or more routing cells configured to route enable signals between segments.

6. The method as recited in claim 1 wherein the plurality of predesigned power switch cells are each designed to occupy a same amount of area as each other one of the plurality of predesigned power switch cells, and the method further comprising:
determining that the power switch configuration for the segment is changed;
selecting power switch cells from the plurality of predesigned power switch cells responsive to the changed configuration; and
placing the selected power switch cells to form the changed segment, wherein the changed segment occupies a same amount of area as the segment in the previous configuration, and wherein abutting the selected power switch cells of the changed segment automatically connects the cells via the interconnect included in the selected power switch cells.

7. A non-transitory computer accessible storage medium storing a plurality of instructions which, when executed on a computer:
receive data identifying a first configuration of power switches in a segment of power switches for a power gated block; and
place power switch cells selected from a plurality of predesigned power switch cells to form the segment responsive to the first configuration, wherein a first power switch cell of the plurality of predesigned power switch cells includes one or more first transistors controlled by a first enable signal and one or more second transistors controlled by a second enable signal, and wherein the first transistors have a first size that is less than a second size of the second transistors, and wherein a second power switch cell of the plurality of predesigned power switch cells includes one or more third transistors having the first size but excludes a connection to the first enable signal for the one or more third transistors, and wherein the first enable signal is routed through the second power switch cell on the interconnect of the second power switch cell to connect to the interconnect of a third power switch cell in the segment, wherein each power switch cell of the plurality of power switch cells occupies a same area of an integrated circuit as each other power switch cell of the power switch cells, and wherein each power switch cell in the plurality of predesigned power switch cells includes interconnect for the first and second enable signals, wherein abutting the power switch cells on the integrated circuit automatically connects the interconnect in each of the cells to form conductive signal paths for the first and second enable signals, the abutting power switch cells forming an electrical connection via contact between the interconnect included in the abutting power switch cells to form the conductive signal paths between the abutting cells in the interconnect.

8. The non-transitory computer accessible storage medium as recited in claim 7 wherein the instructions, when executed:
receive data identifying a second configuration of power switches in the segment; and
replace one or more power switch cells selected from the plurality of predesigned power switch cells to form the segment responsive to the second configuration.

9. The non-transitory computer accessible storage medium as recited in claim 7 wherein the signal paths include a first path propagating the first and second enable signals in a first direction along the segment and a second path propagating the first and second enable signals in a second direction opposite the first direction.

10. The non-transitory computer accessible storage medium as recited in claim 9 wherein at least one type of power switch cells includes a fourth power switch cell that couples to the first path and a fifth power switch cell that couples to the second path.

11. The non-transitory computer accessible storage medium as recited in claim 9 wherein the plurality of predesigned power switch cells includes at least one turn cell that is configured to connect the first path to the second path.

12. The non-transitory computer accessible storage medium as recited in claim 7 wherein at least one of the plurality of predesigned power switch cells comprises only interconnect.

13. A power gated block comprising:
a plurality of logic circuits implementing the operation specified for the power gated block; and
one or more sets of power switches, each set of power switches configured to supply power to subsets of the plurality of logic circuits responsive to one or more enable signals that control the power switches, wherein the one or more enable signals include a first enable signal and a second enable signal, wherein each set of power switches is formed from a plurality of power switch cells, each of the power switch cells occupying a same area of an integrated circuit on which the power gated block is formed as each other one of the plurality of power switch cells, and each of the power switch cells including interconnect wiring that automatically connects to interconnect wiring of an adjacent power switch cell in the set of power switches, wherein a first power switch cell of the plurality of power switch cells includes one or more first transistors controlled by the first enable signal and one or more second transistors controlled by the second enable signal, and wherein the first transistors have a first size that is less than a second size of the second transistors, and wherein a second power switch cell of the plurality of power switch cells includes one or more third transistors having the first size but excludes a connection to the first enable signal for the one or more third transistors, and wherein the first enable signal is routed through the second power switch cell on the interconnect wiring of the second power switch cell to connect to the interconnect wiring of a third power switch cell in the set of power switches.

14. The power gated block as recited in claim 13 wherein the one or more first transistors in the second power switch cell are controlled by the second enable signal.

15. An integrated circuit comprising:

a power manager configured to control power to at least one power gated block in the integrated circuit, wherein the power manager is configured to provide at least a first enable and a second enable to the power gated block, wherein the first enable controls first power switch transistors in the power gated block and the second enable controls second power switch transistors in the power gated block, wherein a size of the second power switch transistors is greater than a size of the first power switch transistors, and wherein the power manager is configured to assert the first enable prior to asserting the second enable during power up of the power gated block; and the power gated block coupled to receive the first enable and the second enable from the power manager, wherein the power gated block comprises a plurality of power switch cells placed adjacent to each other to form a first set of power switches in the power gated block, and wherein a first power switch cell of the plurality of power switch cells includes a first one or more of the first transistors that are controlled by the second enable instead of the first enable and a first one or more of the second transistors that are also controlled by the second enable, and wherein a second power switch cell of the plurality of power switch cells includes a second one or more of the first transistors that are controlled by the first enable and a second one or more of the second transistors that are controlled by the second enable, and wherein the first enable is routed through the first power switch cell to connect to the second power switch cell in the plurality of power switch cells.

16. The integrated circuit as recited in claim 15 wherein the plurality of power switch cells includes a third power switch cell that comprises buffer circuitry for the first enable.

17. The integrated circuit as recited in claim 15 wherein the plurality of power switch cells include a flop cell that captures the first enable in a flop and propagates the first enable in a subsequent clock cycle of a clock that controls the flop.

18. The integrated circuit as recited in claim 15 wherein the plurality of power switch cells include a turn cell that is coupled to receive the first enable and the second enable propagating in a first direction across the plurality of power switch cells and configured to propagate the first enable and the second enable in a second direction.

19. The integrated circuit as recited in claim 18 wherein the plurality of power switch cells include additional cells that couple to the first enable and the second enable traveling in the second direction.

20. The integrated circuit as recited in claim 15 wherein the plurality of power switch cells each occupy a specified amount of area that is the same for each of the plurality of power switch cells.

* * * * *